May 11, 1926.

C. C. BEAR 1,584,161

CARRIER FOR INFANTS OR YOUNG CHILDREN

Filed May 12, 1925

Inventor

CLAUD C. BEAR,

By

Attorney

Patented May 11, 1926.

1,584,161

UNITED STATES PATENT OFFICE.

CLAUD C. BEAR, OF DENISON, TEXAS.

CARRIER FOR INFANTS OR YOUNG CHILDREN.

Application filed May 12, 1925. Serial No. 29,765.

My invention relates to a support or carrier for a baby, or young child, adapted for use in connection with the seat of an automobile.

An important object of the invention is to provide a device of the above mentioned character, which will hold the child, and permit of the same standing or sitting, at will, thereby promoting the comfort of the child.

A further object of the invention is to provide a device of the above mentioned character embodying a frame adapted to be constructed in a shape or curve to conform to the curve of the upholstery of the automobile seat, with the lower end of the frame projecting downwardly between the bottom and back cushions, and held in place between the same, while being positively supported by the bottom seat supporting member or the frame.

A further object of the invention is to provide a device of the above mentioned character which is neat and pleasing in appearance, strong, and possessing some degree of resiliency, so that it may yield slightly, to promote the comfort of the child.

Other objects and advantages of the invention will be apparent during the course of the following description.

Figure 1:
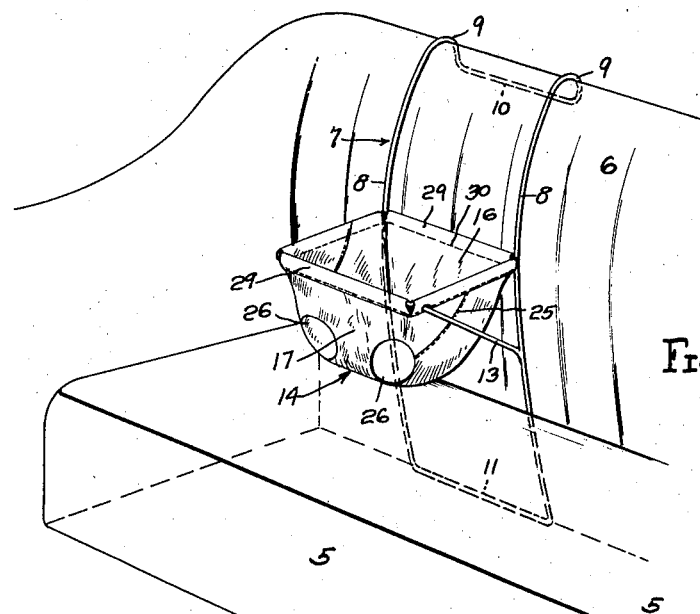
Figure 2:
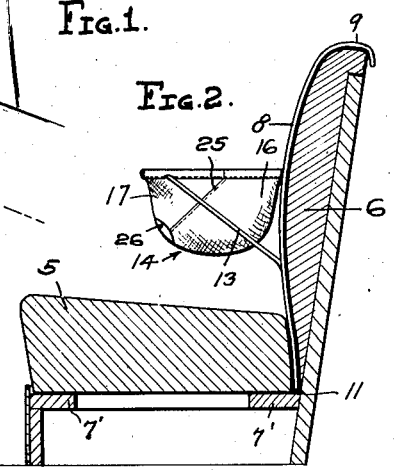
Figure 3:
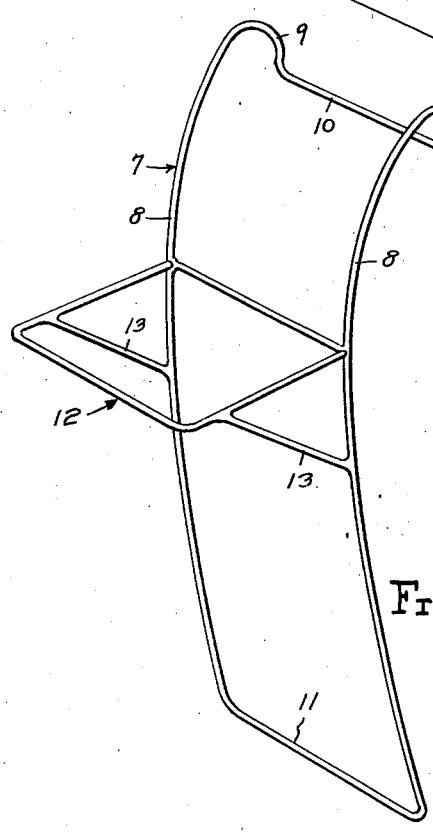
Figure 4:
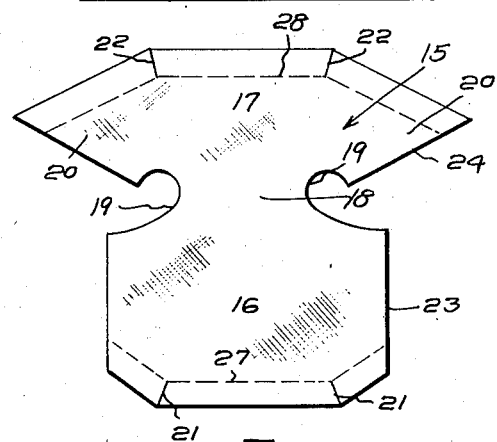

In the accompanying drawings forming a part of this specification and in which like numerals are employed to designate like parts throughout the same, Figure 1 is a perspective view of a support or carrier embodying my invention, showing the same in use, Figure 2 is a side elevation of the same, showing the lower end of the frame engaging the bottom of the seat cushion supporting member or frame, Figure 3 is a perspective view of the frame of the device, and, Figure 4 is a plan view of the blank from which the flexible seat of the device is made.

In the drawings, wherein for the purpose of illustration is shown a preferred embodiment of my invention, the numeral 5 designates a bottom or seat cushion of an automobile and 6 the back cushion, included in the usual upholstery. The seat cushion 5 is supported upon the usual frame or member 7', as is well known. The seat cushion has its rear end arranged close to the back cushion, and is held against forward movement with relation thereto, as is the ordinary construction in automobiles.

My support or carrier embodies an upstanding generally rectangular frame 7, which is preferably formed of suitably large hard-drawn wire. This frame may be made of a single section of wire, having its ends welded together. The frame embodies sides 8, which are longitudinally curved, to correspond to the curvature of the back cushion 6, and at their upper ends, the sides 8 are bent downwardly into rearwardly extending hooks or curved arms 9, connected by a horizontal transverse portion 10. At their lower ends the sides 8 are connected by a horizontal transverse portion 11, which is adapted to rest upon the supporting member or frame 7. I contemplate constructing the frame 7 of a suitable length and curvature, for use with a particular car, so that it will correspond to the curvature of the back cushion 6, and will be of a proper length, so that the transverse portion 11 will rest upon and be supported by the frame or member 7'.

The numeral 12 designates a seat-frame which is preferably rectangular, and may also be formed of suitably stout wire and which may be welded to the upstanding supporting frame 7. The frame 12 has connection with diagonal braces 13, welded thereto, and extending downwardly to be welded to the sides 8.

The seat-frame 12 carries a flexible seat 14, which may be formed of cloth, such as canvas or the like. The seat 14 is formed from a blank 15, Figure 4, embodying a rear portion 16 and a front portion 17, connected by a tapered portion 18, forming curved openings 19. The ends of the front portion 17 are tapered, as shown at 20. The rear portion 16 has transverse slits 21 and the front portion 17 is provided with transverse slits 22. The rear and front portions are folded upon the reduced portion 18, and the edges 23 and 24 are secured together, as by stitching, as indicated at 25, producing an enclosed seat, having forwardly arranged leg openings 26. The upper edges of the rear and forward portions 17, are folded longitudinally upon lines 27 and 28, providing hems 29, having stitching 30. These hems receive the sides and ends of the seat-frame 12.

The seat-frame 12 is at a suitable elevation from the seat cushion 5, so that the child or infant held within the flexible seat 14 may conveniently stand upon the seat cushion, and may also sit, when desired. The seat 15 being flexible, and suspended, allows considerable freedom of movement of the child, and permit of a restricted swaying movement of the child, due to the movements of the automobile. As the bottom 11 of the supporting frame rests upon the seat supporting frame 7', the seat-frame 12 will not sag forwardly, when the child leans forwardly in the device. The wire or rod from which the device is formed is suitably rigid, so that the seat-frame 12 will not sag when weight is pushed to the free end of the seat-frame. However, such material possesses considerable resiliency, tending to absorb shocks, and promoting the comfort of the user.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. A carrier for infants or young children, comprising a continuous substantially rectangular resilient frame, said frame embodying sides which are curved longitudinally to conform to the curvature of the back cushion of an automobile and bent at their upper ends into down turned hooks to engage over the top of said back cushion, and ends which connect the hooks and the bottoms of the sides; the upper end serving to engage the rear of the back cushion and the lower end serving to engage the seat cushion support; a seat frame carried by the first named frame; and a seat carried by the seat frame.

2. A carrier for infants or young children, comprising a continuous substantially rectangular resilient frame, said frame embodying sides which are curved longitudinally to conform to the curvature of the back cushion of an automobile and bent at their upper ends into down turned hooks to engage over the top of said back cushion, and ends which connect the hooks and the bottoms of the sides; the upper end serving to engage the rear of the back cushion and the lower end serving to engage the seat cushion support; a generally horizontal seat frame carried by the supporting frame at a suitable elevation above the seat cushion, and a flexible seat suspended from the seat frame and having leg receiving openings, the flexible seat being positioned at an elevation with respect to the seat cushion so that the child may stand upon the seat cushion, or sit, at will.

3. A carrier for infants and young children, comprising an upstanding supporting portion embodying a pair of resilient rods which are longitudinally curved and adapted to be arranged in advance of the back seat cushion of an automobile, said rods being provided at their upper ends with down-turned hooks to engage over the top of the back seat cushion, said rods being of sufficient length whereby their lower ends are adapted to rest upon the seat cushion support, a generally horizontal seat frame rigidly attached to the curved rods between their ends and at an elevation above the seat cushion, and a flexible seat suspended from the seat frame and having leg receiving openings positioned beneath the seat frame, the parts being so arranged that the child may sit within the flexible seat or stand upon the seat cushion, at will.

In testimony whereof I affix my signature.

CLAUD C. BEAR.